J. H. LAMONT.
AUTOMATIC VALVE.
APPLICATION FILED OCT. 11, 1912.
1,070,820.
Patented Aug. 19, 1913.
2 SHEETS—SHEET 1.
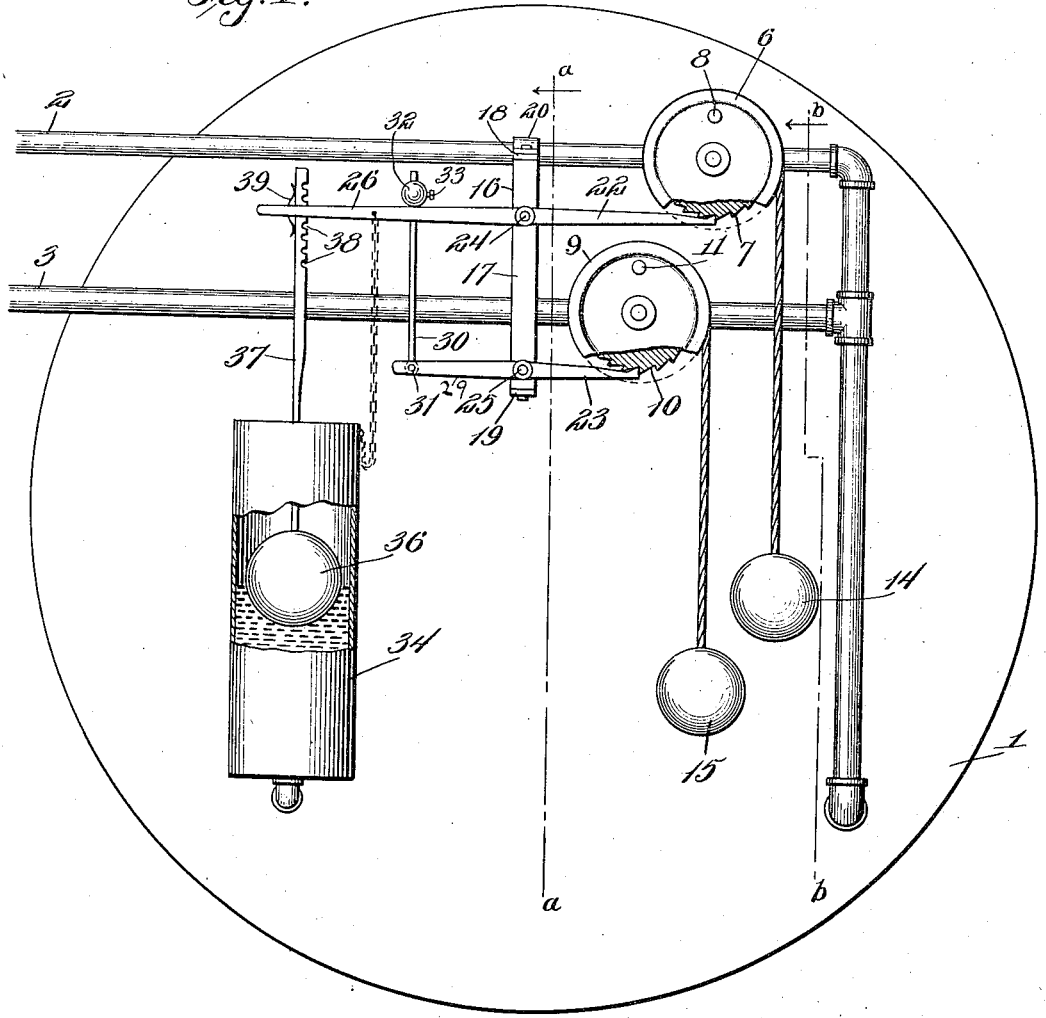
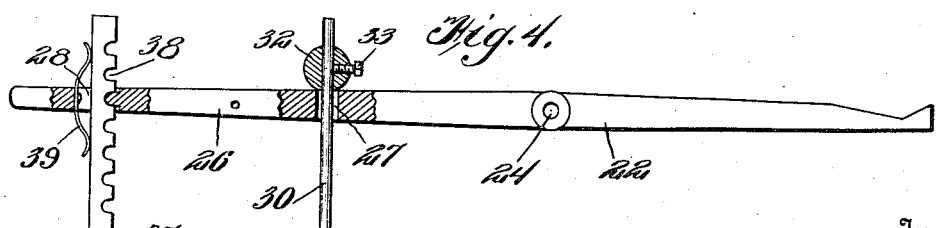
Witnesses
Louis R. Heinrichs
J. W. Garner
Inventor
James H. Lamont
By Victor J. Evans
Attorney

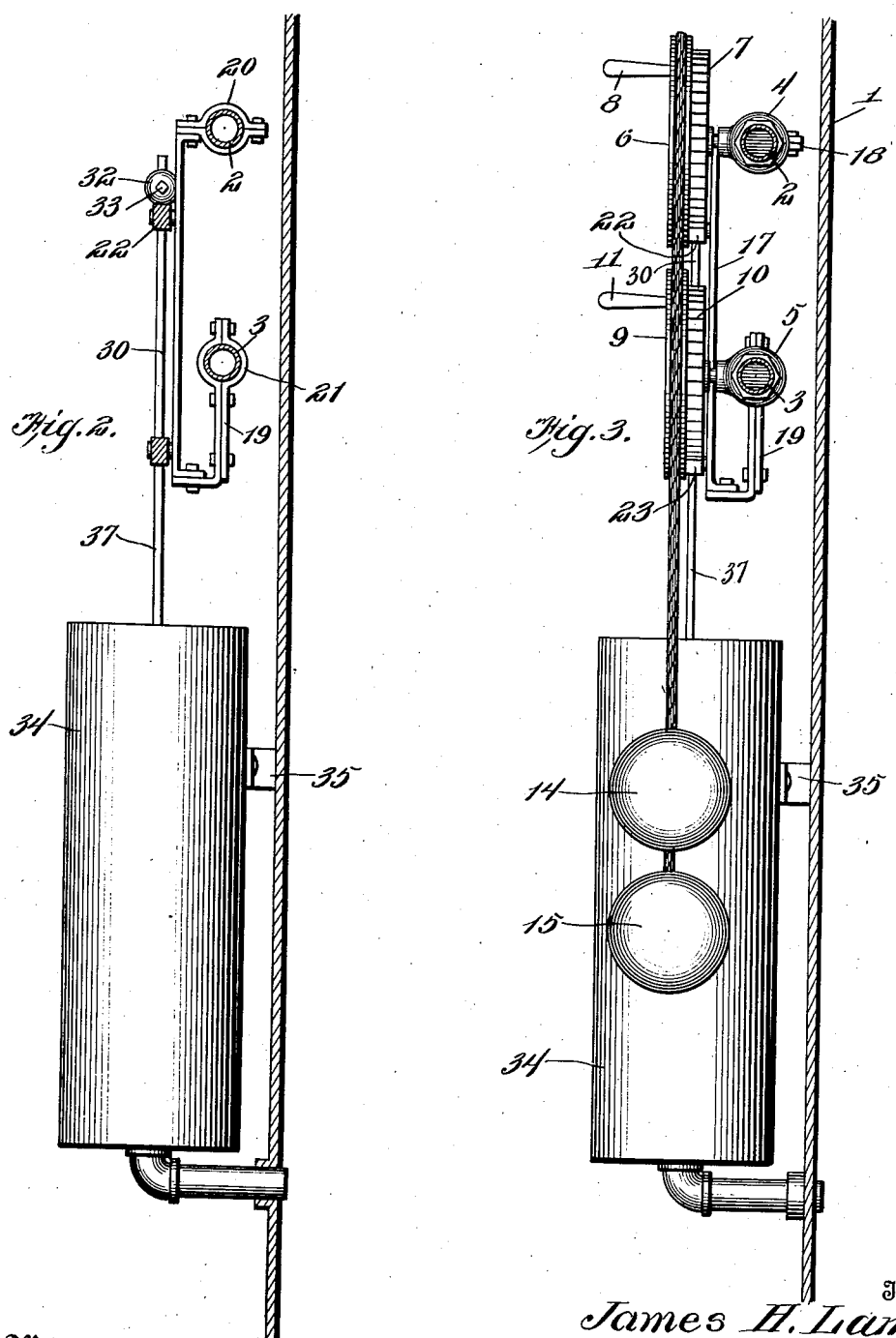

UNITED STATES PATENT OFFICE.

JAMES H. LAMONT, OF SOLDIERS HOME, CALIFORNIA.

AUTOMATIC VALVE.

1,070,820.  Specification of Letters Patent.  Patented Aug. 19, 1913.

Application filed October 11, 1912. Serial No. 725,238.

*To all whom it may concern:*

Be it known that I, JAMES H. LAMONT, a citizen of the United States, residing at Soldiers Home, in the county of Los Angeles and State of California, have invented new and useful Improvements in Automatic Valves, of which the following is a specification.

This invention relates to improvements in automatic valves for laundry washers and other machines for automatically cutting off the flow of water to the machine when the latter is supplied with a sufficient quantity, the invention consisting in the construction, combination and arrangement of devices hereinafter described and claimed.

In the accompanying drawings:—Figure 1 is a side elevation of a laundry washer provided with my improved automatic valves. Fig. 2 is a vertical transverse sectional view on the plane indicated by the line $a$—$a$ of Fig. 1. Fig. 3 is a similar view on the plane indicated by the line $b$—$b$ of Fig. 1. Fig. 4 is a detail sectional view, showing the connections between the upper pawl and the float.

For the purposes of this specification, a body of a laundry washer is indicated at 1 and the water supply pipes therefor are indicated at 2—3. These pipes are, respectively, provided with globe valves indicated at 4—5 and in accordance with my invention, I provide the stem of the valve 4 with a pulley 6 which has a ratchet wheel 7 on its inner side and a handle 8 on its outer side. The stem of the valve 5 is correspondingly provided with a pulley 9 which has a ratchet wheel 10 on its inner side and a handle 11 on its outer side. To the said pulleys are, respectively, attached cords or chains to be wound thereon and unwound therefrom, the said cords or chains being, respectively, provided with weights 14—15. These weights and cords or chains, when the pulleys are released, serve to turn and close the valves so as to cut off the supply of water to the machine. I also, in accordance with my invention, provide a support 16 which comprises a vertical bar 17 and brackets 18—19 at the upper and lower ends of said bar, which brackets include eyes 20—21 for the reception of the upper and lower pipes 2—3 and which are adapted to be clamped on the said pipes so as to detachably secure the support thereto. An upper pawl 22 and a lower pawl 23 are pivotally connected to the bar 17 of the support 16, as at 24—25. These pawls are, respectively, adapted to engage the under side of the ratchet wheels 7—10. The arm 26 of the pawl 22 has a slot 27 at a point a suitable distance from the pivot of the pawl and is also provided with a slot 28 at a point near the outer end of said arm. The pawl 23 has its arm 29 connected to the arm 26 of the pawl 22 by a rod 30. Said rod is pivotally connected at its lower end as at 31 to the arm 29 and passes up through the slot 27 and carries a stop collar 32 which is adjustable on its upper end, may be secured in place at any desired adjustment by a set screw 33 and bears normally on the upper side of the arm 26. A float column 34 which has further communication with the body 1 of the washing machine is secured on the said body as by means of a bracket 35. A float 36 operates in the said column and has a stem 37 which extends up through a slot 28 of the arm of the upper pawl 22. The stem has notches 38, any one of which may be engaged at one end of the said slot and in the opposite end of the said slot is a spring 39 which presses against the stem so as to keep the same connected to the arm 26 at any desired adjustment of the float.

When the water in the body of the washer and in the column 34 is at or below the required level, the pawls by the gravitating action of their arms are kept in engagement with the ratchets and, hence, the weighted cords or chains are kept wound up on the pulleys. When, however, the required water level is reached, the upward movement of the float causes the arms of the pawls to be raised and their points to be depressed and released from the ratchet wheels and thereupon the weighted cords or chains operate on the pulleys and close the valves and prevent a further supply of water to the machine.

By appropriately adjusting the stop collar 32 on the rod 30, the pawls may be adapted for simultaneous movement or for operation of the pawl 22 independently of the pawl 23, as desired. It will be understood from the foregoing description and by reference to the drawings that my improved automatic valve and operating mechanism therefor may be readily attached to and detached from an ordinary laundry washer or other similar machine and that its use requires no change in the construction of the machine.

While I have herein shown and described a preferred form of my invention, I would have it understood that changes may be made in the form, proportion and construction of the several parts without departing from the spirit of the invention and within the scope of the appended claim.

I claim:—

In combination with the water supply pipes of a laundry washer or similar machine, valves for said pipes, pulleys and ratchet wheels on the stems of said valves to turn therewith, weighted cords connected to said pulleys to close said valves when said pulleys are released, a support connected to the said pipes, pawls pivotally mounted on said support and adapted to engage said ratchet wheels, and a float connected to said pawls to release the latter when a desired level of water is in the machine, one of the pawls being adjustably connected to the other pawl and the said float being adjustably connected to the last-named pawl.

In testimony whereof I affix my signature in presence of two witnesses.

JAMES H. LAMONT.

Witnesses:
JAMES A. FURNAS,
JAMES J. NOLAND.